United States Patent
Balandier et al.

(10) Patent No.: US 11,157,668 B2
(45) Date of Patent: Oct. 26, 2021

(54) DETERMINATION OF A LIFE DEFINING QUANTITY

(71) Applicant: Siemens Aktiengesellschaft, Munich (DE)

(72) Inventors: Quentin Luc Balandier, Leicester (GB); Mark Osborne, Harmston (GB)

(73) Assignee: Siemens Energy Global GmbH & Co. KG, Munich (DE)

( * ) Notice: Subject to any disclaimer, the term of this patent is extended or adjusted under 35 U.S.C. 154(b) by 183 days.

(21) Appl. No.: 16/392,875

(22) Filed: Apr. 24, 2019

(65) Prior Publication Data

US 2019/0354651 A1 Nov. 21, 2019

(30) Foreign Application Priority Data

May 15, 2018 (EP) .................................... 18172319

(51) Int. Cl.
*B29C 64/393* (2017.01)
*G06F 30/23* (2020.01)
(Continued)

(52) U.S. Cl.
CPC .............. *G06F 30/23* (2020.01); *B22F 10/20* (2021.01); *B29C 64/153* (2017.08);
(Continued)

(58) Field of Classification Search
CPC ... G06F 30/23; G06F 2119/18; B29C 64/153; B29C 64/393; B22F 3/1055; B22F 2003/1057; B33Y 10/00; B33Y 50/02
See application file for complete search history.

(56) References Cited

U.S. PATENT DOCUMENTS

| 2014/0300017 A1* | 10/2014 | Wighton | ............... | B29C 64/141 |
| | | | | 264/40.1 |
| 2016/0054205 A1* | 2/2016 | O'Neill | .................. | G01N 1/286 |
| | | | | 73/863 |

(Continued)

FOREIGN PATENT DOCUMENTS

| CN | 107521099 A | 12/2017 |
| CN | 108312547 A | 7/2018 |

(Continued)

OTHER PUBLICATIONS

Peng, Dequan et al: "Discussion on the Properties of the Parts Processed by Fused Deposition Technology"; pp. 99-100; Apr. 30, 2018; DOI: 10.19353/j .cnki.dzsj Aug. 5, 2018; China Academic Journal Electronic Publishing House; http://www.cnki.net.

*Primary Examiner* — Gary Collins

(57) ABSTRACT

A method of determining a life defining quantity of a production component manufactured by an additive manufacturing process. The method includes the step of defining a plurality of components to be manufactured by an additive manufacturing technique. The plurality of components has a first test piece and a first production component. The method further includes manufacturing the components in the same manufacturing batch using an additive manufacturing process and with nominally the same material composition and build parameters. A characteristic mechanical property of the first test piece is then determined. The method further includes determining a value of a life defining quantity of the first production component as a function of the first test piece characteristic mechanical property. The first production component and first test piece are then provided with indicators which associate the first production component with the determined life defining quantity.

11 Claims, 4 Drawing Sheets

(51) Int. Cl.
*B29C 64/153* (2017.01)
*B22F 10/20* (2021.01)
*B33Y 10/00* (2015.01)
*B33Y 50/02* (2015.01)
*G06F 119/18* (2020.01)
*B22F 10/30* (2021.01)

(52) U.S. Cl.
CPC ............ *B29C 64/393* (2017.08); *B22F 10/30* (2021.01); *B33Y 10/00* (2014.12); *B33Y 50/02* (2014.12); *G06F 2119/18* (2020.01)

(56) References Cited

U.S. PATENT DOCUMENTS

| | | | |
|---|---|---|---|
| 2016/0098825 A1* | 4/2016 | Dave | G06K 9/6201 |
| | | | 419/53 |
| 2017/0120529 A1 | 5/2017 | DeMuth et al. | |
| 2017/0220031 A1* | 8/2017 | Morovic, Jr. | B29C 64/393 |
| 2018/0001570 A1 | 1/2018 | Cahn | |
| 2018/0088559 A1* | 3/2018 | Salem | B29C 64/393 |
| 2018/0215091 A1 | 8/2018 | Einav et al. | |

FOREIGN PATENT DOCUMENTS

| | | | |
|---|---|---|---|
| EP | 3255213 A1 | 12/2017 | |
| WO | 2016094827 A1 | 6/2016 | |

\* cited by examiner

DETERMINATION OF A LIFE DEFINING QUANTITY

CROSS REFERENCE TO RELATED APPLICATIONS

This application claims the benefit of European Application No. EP18172319 filed May 15, 2018, incorporated by reference herein in its entirety.

FIELD OF INVENTION

The disclosure is concerned with a method of determining a life defining quantity of a component manufactured by an additive manufacturing process.

BACKGROUND

The quality of products made by Additive Manufacturing techniques are sensitive to a number of variables, for example component geometry and build designs, powder specification and handling, fusion laser performance (e.g. power output and optics quality), post build manufacturing processes and finishing, inspection methods, interruptions during manufacture, material contamination and/or operator error and technique.

This may make quality consistency difficult to achieve. Hence in examples where it is essential to be able to guarantee quality of the product being manufactured, conventional verification techniques (for example finite element modelling based on standard material physical properties, testing of samples of material to be used to manufacture the components and/or testing a percentage of the parts made, component life estimation using minimum material properties and stresses from a finite element model) may not provide the certainty required. For example, certification of a component in a gas turbine, where components are subject to challenging environments, conventional quality verification practices may require extensive testing of a higher number of additive manufactured components than required for articles made by a conventional manufacturing technique (for example casting) thereby making manufacture of components by additive manufacturing commercially less attractive.

Also, the impact of all possible build parameters used in the additive manufacturing route to the mechanical properties of the component are not fully known or quantified in the present state of the art.

Given that additive manufacturing provides opportunities for manufacturing with many benefits (for example speed and simplicity of manufacture), a method of verifying the physical integrity, and hence assessing likely operational life of parts made by an additive manufacturing technique is highly desirable.

SUMMARY

According to the present disclosure there is provided apparatus and methods as set forth in the appended claims. Other features of the invention will be apparent from the dependent claims, and the description which follows.

Accordingly, there may be provided a method of determining a life defining quantity of a production component (100, 200) manufactured by an additive manufacturing process. The method may comprise the step of defining a plurality of components (100, 200, 300) to be manufactured by an additive manufacturing process defined by a parameter set, wherein the plurality of components (100, 200, 300) comprises a first test piece (310) and a first production component (100). The method may further comprise the step of manufacturing the components in the same manufacturing batch using an additive manufacturing process, with nominally the same material composition and build process parameters, determining a characteristic mechanical property of the first test piece (310) and determining a value of a life defining quantity of the first production component (100) as a function of the first test piece (310) characteristic mechanical property. The method also comprises the step of providing the first production component (100) with a first indicator (340) and providing the first test piece (310) with a second indicator (341), wherein the first indicator (340) and the second indicator (341) associate the first production component (100) and the first test piece (310) with the determined life defining quantity, the first test piece mechanical property, and the additive manufacturing parameter set. Hence there is provided a method of manufacturing and testing an additive manufactured component to provide greater certainty of life estimates and quality of production components.

The characteristic mechanical property may be one of:
a. Elasticity modulus;
b. Density;
c. Ultimate tensile strength;
d. Proof strength;
e. Low cycle fatigue strength;
f. High fatigue strength;
g. Creep strength and/or ductility;
h. Oxidation resistance; or
i. Corrosion resistance.

These advantageously provide definitions of key properties of the materials used.

The life defining quantity may be indicative of the expected operational life and/or number of operational cycles of the first production component (100). Hence the life defining quantity provides a user with information about the useful and/or safe life of the component.

The additive manufacturing parameter set may comprise at least one of a list of parameters related to the plurality of components, the list of parameters comprising:
CAD model geometry reference of the manufacturing batch of the plurality of components;
Part numbers of the plurality of components;
Material powder composition reference used in the manufacture of the plurality of components;
Build parameters of a machine operable to execute the additive manufacturing process; and/or
Definition of manufacturing processes after completion of the additive manufacturing process.

The material powder may comprise a number of elements. For example a Nickel (Ni) based alloy used in turbine components operating at elevated temperatures may comprise Nickel (Ni), Chromium (Cr), Cobalt (Co), Molybdenum (Mo), Tungsten (W), Tantalum (Ta), Niobium (Nb, or Columbium, Cb), Aluminium (Al), Titanium (Ti), Iron (Fe), Manganese (Mn), Silicon (Si), Carbon (C), Boron (B), Zirconium (Zr). The relative proportion of the elements of the powder composition, at least in part, defines the mechanical properties of the manufactured components.

For a further manufacturing batch of the plurality of components (that is to say, a manufacturing batch made after a batch for which the first test piece characteristic material property and life defining quantity have been determined), at least one of:

CAD model geometry of the manufacturing batch of the plurality of components;
Part numbers of the plurality of components;
Material powder composition;
Build parameters of a machine operable to execute the additive manufacturing process;
Definition of manufacturing processes after completion of the additive manufacturing process;

may be determined in dependence of the determined mechanical property of the first test piece and determined value of the life defining quantity.

The manufacturing batch may be formed on a common build plate (350). This is advantageous as the relationship between the articles made on the same build plate is clearly established—i.e. having all been made at the same time, from the same materials by the same machine ensures that determinations made about the test pieces can be reliably read across to production components.

The plurality of components (100, 200, 300) may be manufactured in a three dimensional space defined by orthogonal axes x, y and z, wherein the first test piece (310) has a first longitudinal axis (312) and the first test piece (310) is formed such that its longitudinal axis (312) is parallel to one of the x, y or z axes. This is advantageous as this identifies the orientations of manufacture which may be relevant to interpretation of empirical test results.

The plurality of components may comprise a second test piece (320), and the second test piece (320) may have a second longitudinal axis (322) and the second test piece (320) is formed such that its second longitudinal axis (322) is parallel to a different one of the axes x, y or z than the first longitudinal axis (312) of the first test piece (310). This is advantageous as comparison of test pieces made in different orientations may be relevant to interpretation of empirical test results.

The method may further comprise the steps of determining a characteristic mechanical property of the second test piece (320), for example by using an empirical method, and determining the value of a life defining quantity of the first production component (100) as a function of the second test piece (320) characteristic mechanical property. Hence the life of the production component may be more accurately assessed as it is determined on the basis of further empirical data.

The plurality of components may comprise a third test piece (330), where the third test piece (330) has a third longitudinal axis (332) and the third test piece (330) is formed such that its third longitudinal axis (332) is parallel to a different one of the axes than the first longitudinal axis (312) of the first test piece (310) or second longitudinal axis (322) of the second test piece (320). This is advantageous as comparison of test pieces made in different orientations may be relevant to interpretation of empirical test results.

The method may further comprise determining a characteristic mechanical property of the third test piece (330), and determining the value of a life defining quantity of the first production component (100) as a function of the third test piece (330) characteristic mechanical property. Hence the life of the production component may be more accurately assessed as it is determined on the basis of further empirical data.

The plurality of components (100, 200, 300) may comprise a second production component (200), where the first production component (100) is formed in a first orientation relative to the x, y or z axes, and the second production component (200) is formed in the same orientation relative to the x, y or z axes as the first production component (100), and the second production component (200) is provided with a third indicator (342) which associates the second production component (200) with the determined life defining quantity and additive manufacturing parameter set. Hence multiple production components may be made and determinations made about one of the production components, for example based on empirical testing or operational use, may be used to generate life defining information on the other component in the same batch.

The method may further comprise, prior to determining the characteristic mechanical property of the first test piece (310), the step of removing material from the first test piece (310), for example by machining, to define a gauge portion (400) of a predetermined geometry and size. In an example where the material is removed by machining, the characteristic mechanical property of the test piece with a machined surface finish may be determined. This enables the effect of machining on the material of the test piece to be determined, and hence the effect of machining of the production component to be inferred or determined.

The method may further comprise the step of a method of manufacturing a plurality of components (100, 200, 300) wherein the plurality of components (100, 200, 300) comprises a first test piece (310) and a first production component (100), the method comprising the steps of manufacturing the plurality of components (100, 200, 300) in the same manufacturing batch using an additive manufacturing process and with nominally the same material composition.

The manufacturing batch may be formed on a common build plate (350).

There may also be provided a batch of components (100, 200, 300) made by an additive manufacturing process, the batch comprising a first production component (100) and a first test piece (310), the first production component (100) and the first test piece (310) having the same nominal material composition.

The plurality of components (100, 200, 300) may be manufactured in a three dimensional space defined by orthogonal axes x, y and z, wherein the first test piece (310) has a first longitudinal axis (312) and the first test piece (310) is formed such that its longitudinal axis (312) is parallel to one of the x, y or z axes; and the first production component (100) is formed in a first orientation relative to the x, y or z axes.

Hence there is provided a method of lifing an component manufactured by an additive manufacturing process, a method of manufacturing a plurality of components which enables the lifing method, and a batch of components (e.g. a kit of components) which enable the lifing method.

BRIEF DESCRIPTION OF THE DRAWINGS

Examples of the present disclosure will now be described with reference to the accompanying drawings, in which.

DETAILED DESCRIPTION

The present disclosure relates to a method of determining a life defining quantity of a component manufactured by an additive manufacturing process, a method of manufacturing a plurality of components and a batch of components made by an additive manufacturing process. The components may be components for a turbomachine, for example a gas turbine engine. Hence the present disclosure also relates to a method of manufacturing a component which compromises defining a plurality of components, some of which are used for testing and qualification (e.g. verification) of other components made in the same batch. The components may comprise a component for a turbo machine, for example a rotor blade, stator vane or rotor disc.

Figure 1:
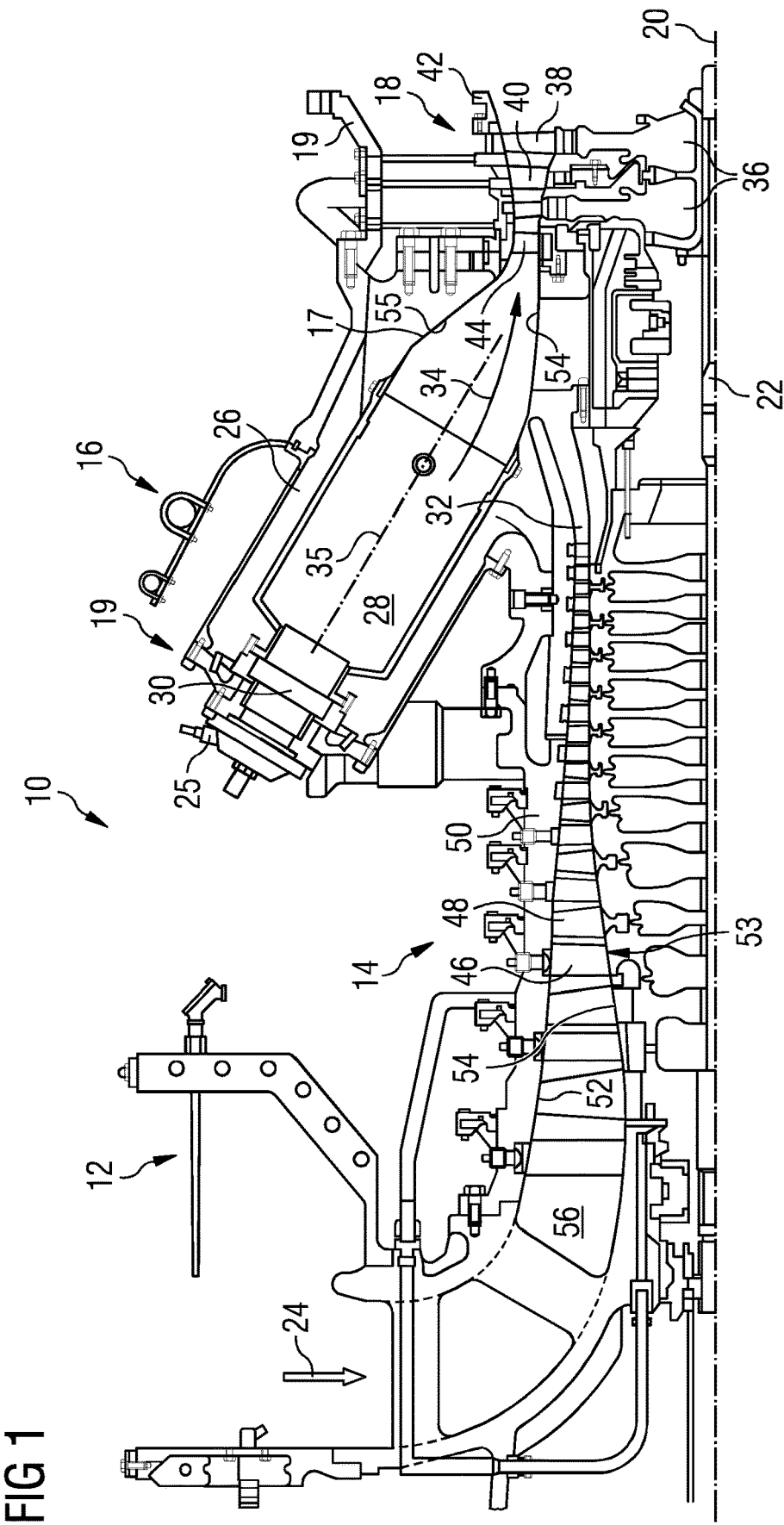
FIG. 1 shows an example of a gas turbine engine, components of which may be manufactured and assessed by the method of the present disclosure.

FIG. 1 shows an example of a gas turbine engine 60 in a sectional view which may comprise a gas turbine engine component (e.g. an aerofoil, rotor blade, stator vane or rotor disc) manufactured and/or assessed by a method according to the present disclosure.

The gas turbine engine 10 comprises, in flow series, an inlet 12, a compressor section 14, a combustor section 16 and a turbine section 18 which are generally arranged in flow series and generally about and in the direction of a longitudinal or rotational axis 20. The gas turbine engine 10 further comprises a shaft 22 which is rotatable about the rotational axis 20 and which extends longitudinally through the gas turbine engine 10. The shaft 22 drivingly connects the turbine section 18 to the compressor section 14.

In operation of the gas turbine engine 10, air 24, which is taken in through the air inlet 12 is compressed by the compressor section 14 and delivered to the combustion section or burner section 16. The burner section 16 comprises a burner plenum 26, one or more combustion chambers 28 and at least one burner 30 fixed to each combustion chamber 28. The combustion chambers 28 and the burners 30 are located inside the burner plenum 26. The compressed air passing through the compressor 14 enters a diffuser 32 and is discharged from the diffuser 32 into the burner plenum 26 from where a portion of the air enters the burner 30 and is mixed with a gaseous or liquid fuel. The air/fuel mixture is then burned and the combustion gas 34 or working gas from the combustion is channelled through the combustion chamber 28 to the turbine section 18 via a transition duct 17.

This exemplary gas turbine engine 10 has a cannular combustor section arrangement 16, which is constituted by an annular array of combustor cans 19 each having the burner 30 and the combustion chamber 28, the transition duct 17 has a generally circular inlet that interfaces with the combustor chamber 28 and an outlet in the form of an annular segment. An annular array of transition duct outlets form an annulus for channelling the combustion gases to the turbine 18.

The turbine section 18 comprises a number of blade carrying discs 36 attached to the shaft 22. In the present example, two discs 36 each carry an annular array of turbine blades 38. However, the number of blade carrying discs could be different, i.e. only one disc or more than two discs. In addition, guiding vanes 40, which are fixed to a stator 42 of the gas turbine engine 10, are disposed between the stages of annular arrays of turbine blades 38. Between the exit of the combustion chamber 28 and the leading turbine blades 38 inlet guiding vanes 44 are provided and turn the flow of working gas onto the turbine blades 38.

The combustion gas from the combustion chamber 28 enters the turbine section 18 and drives the turbine blades 38 which in turn rotate the shaft 22. The guiding vanes 40, 44 serve to optimise the angle of the combustion or working gas on the turbine blades 38.

The turbine section 18 drives the compressor section 14. The compressor section 14 comprises an axial series of vane stages 46 and rotor blade stages 48. The rotor blade stages 48 comprise a rotor disc supporting an annular array of blades. The compressor section 14 also comprises a casing 50 that surrounds the rotor stages and supports the vane stages 48. The guide vane stages include an annular array of radially extending vanes that are mounted to the casing 50. The vanes are provided to present gas flow at an optimal angle for the blades at a given engine operational point. Some of the guide vane stages have variable vanes, where the angle of the vanes, about their own longitudinal axis, can be adjusted for angle according to air flow characteristics that can occur at different engine operations conditions.

The casing 50 defines a radially outer surface 52 of the passage 56 of the compressor 14. A radially inner surface 54 of the passage 56 is at least partly defined by a rotor drum 53 of the rotor which is partly defined by the annular array of blades 48.

The present invention is described with reference to the above exemplary turbine engine having a single shaft or spool connecting a single, multi-stage compressor and a single, one or more stage turbine. However, it should be appreciated that the present invention is equally applicable to two or three shaft engines and which can be used for industrial, aero or marine applications.

The terms upstream and downstream refer to the flow direction of the airflow and/or working gas flow through the engine unless otherwise stated. The terms forward and rearward refer to the general flow of gas through the engine. The terms axial, radial and circumferential are made with reference to the rotational axis 20 of the engine.

Figure 2:
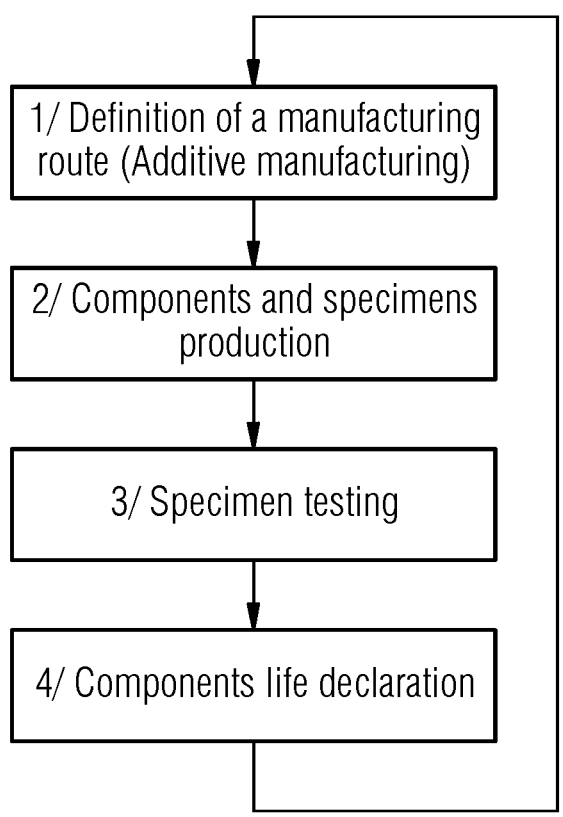
FIG. 2 is flow diagram summarising the method of the present disclosure.

FIG. 2 shows a summary of a lifing method, iterative design method and/or iterative manufacturing method according to the present disclosure. This may be expressed in four steps, namely:

Step 1: define the applicable manufacturing technique/route, namely an additive manufacturing process defined by a parameter set. Additive manufacturing refers to processes executed by a machine used to create a three dimensional object from layers of a powdered material. A laser, under computer control, fuses layers of the powdered material together to create the object. Step 1 also includes defining the batch of components to be manufactured, which will comprise a first test piece 310 and a first production component 100. The geometry, size, relative orientation and spacing of the batch of components may be defined in a CAD (computer aided design) model.

Step 2: manufacture the batch of components.

Step 3: conduct tests on the test piece (or tests pieces, depending on how many are made) in order to determine mechanical properties of the test pieces.

Step 4: define a life of the component made in the same batch as the test piece using as a function of the determined mechanical properties of the test pieces. Having defined the life of the production component, the data gathered may be fed back into the start of the process to (Step 1) to inform choices made about the material composition used, design decisions made (e.g. geometry of the components), manufacturing process (e.g. material handling, laser power and scanning speeds) in order to produce a component with the desired life (and/or an alloy with the desired mechanical properties).

Figure 3:
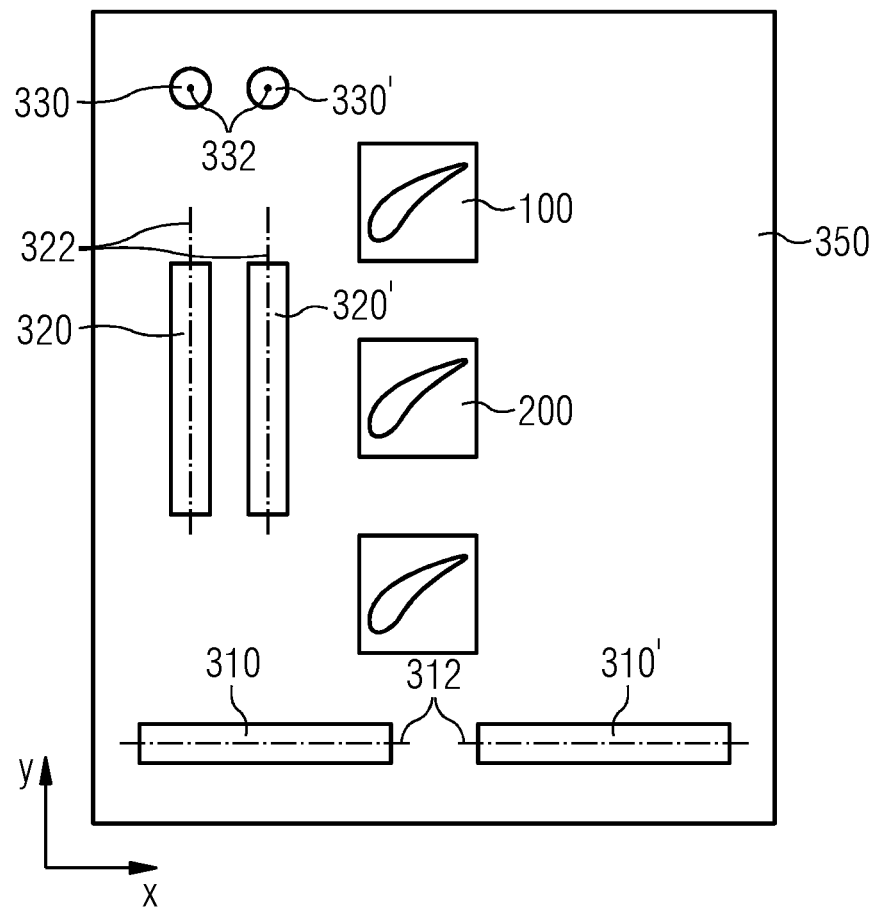
FIG. 3 is a schematic 2D plan view of a batch of components made by the method of the present disclosure, including test pieces according to the present disclosure.

The method may be expressed in terms of a method of determining a life defining quantity of a component manufactured by an additive manufacturing process. Hence the method comprises the steps of defining the geometry, spacing and relative orientation of a plurality of components to be manufactured by an additive manufacturing technique. By way of example, FIG. 3 illustrates a plurality of components, shown in a 2D plan view. The plurality of components comprises a first test piece 310 (which may also be referred to as a "specimen") and a first production component 100. In the example shown the first production component 100 is a rotor blade for a turbo machine. However, the production component may be any other component. The term "production" component is taken to mean a component which is configured for operational use in machine for which it is provided. Hence the test piece is configured to be appropriate for material testing, whereas the production component is configured as a nominally "finished" operational design.

As shown in FIG. 3, the manufacturing batch may be formed on a common build plate 350. Hence the batch is defined by the articles formed on the common build plate 350. The build plate 350 may be a pre manufactured platform onto which the plurality of components are formed.

The method further comprises the step of manufacturing the plurality of components in the same manufacturing batch using an additive manufacturing process and with nominally the same material composition. Hence the plurality components in each batch are manufactured simultaneously, using the same equipment and materials, and hence have substantially the same material properties as each other.

Figure 4:
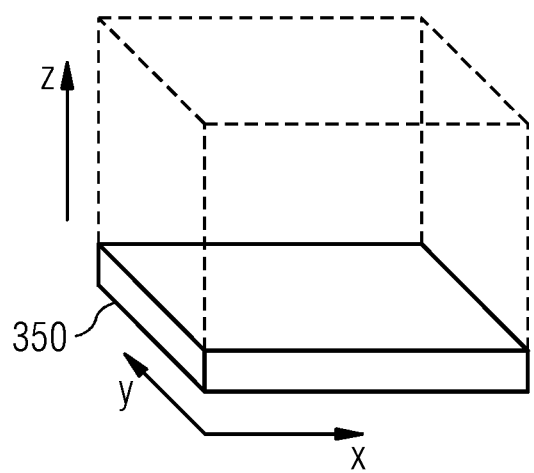
FIG. 4 is a representation of a 3D space in which the components are defined.

As illustrated in FIGS. 3, 4, the plurality components are manufactured (i.e. formed) in a three dimensional space defined 3D orthogonal axes x, y and z. The first production component 100 is formed in a first orientation relative to the x, y or z axes.

The first test piece 310 has a first longitudinal axis 312 and the first test piece 310 is formed such that its longitudinal axis 312 is parallel to (i.e. extends in the direction of) one of the x, y or z axes. In the example shown the first longitudinal axis 312 extends in the x axis direction.

Figure 5:
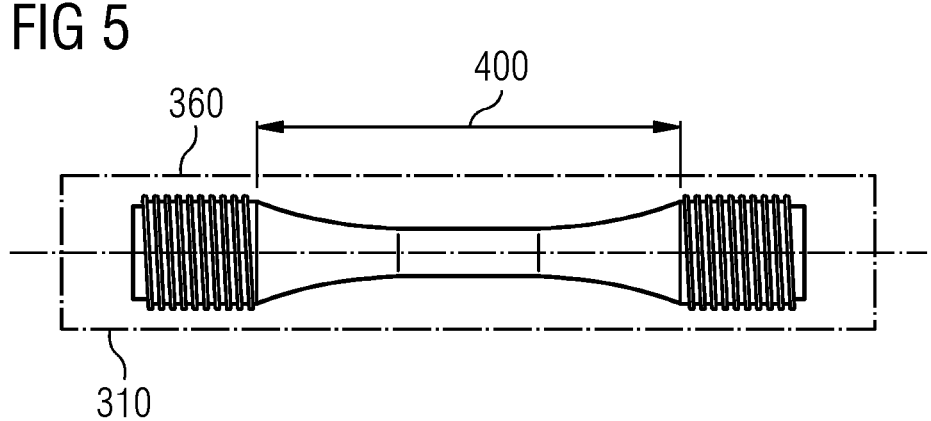
FIGS. 5, 6 show examples of the test pieces shown in FIG. 3.

The first test piece may comprise a cylindrical portion 360 (for example as shown in FIG. 5, 6), where the longitudinal axis 312 is along the central axis of the cylindrical portion 360.

As shown in FIG. 3 the plurality of components may also comprise a second test piece 320, where the second test piece 320 has a second longitudinal axis 322. The second test piece 320 is formed such that its second longitudinal axis 322 is parallel to (i.e. extends in the direction of) a different one of the axes x, y or z than the first longitudinal axis 312 of the first test piece 310. In the example shown the second longitudinal axis 322 extends in the y axis direction at right angles to the x axis.

Also, as shown in FIG. 3, the plurality of components may comprise a third test piece 330, where the third test piece 330 has a third longitudinal axis 332. The third test piece 330 may be formed such that its third longitudinal axis 332 is parallel to (i.e. extends in the direction of) a different one of the axes than the first longitudinal axis 312 of the first test piece 310 or second longitudinal axis 322 of the second test piece 320. In the example shown the third longitudinal axis 332 extends in the z axis, at right angles to the x axis and y axis.

The plurality of components may comprise further test pieces 310', 320', 330', for example identical and aligned with the other test pieces 310, 320, 330 respectively. Hence where use of test pieces 310, 320, 330 are described below, the further test pieces 310', 320', 330' respectively may be used for the same purpose and have the same material properties.

The test pieces may all have substantially the same size and shape. Alternatively, at least some of the test pieces may have a different shape to the others. For example, some of the test pieces may be produced to be cylindrical, rectangular, polyhedral or other three dimensional shape. The test pieces may also include standard or non-standard stress concentration features, such as holes, notches.

The plurality of components may also comprise a second production component 200 substantially identical to the first production component. Alternatively, the second production component 200 may be of a different design to the first production component, for example a design variation or an entirely different part. Optionally the plurality of components may also comprise further production components, which may have the same or different design as the first or second production components. The second production component 200 is formed the same orientation relative to the x, y or z axes as the first production component 100.

The manufacturing process may comprise additional processes after the additive manufacturing process, for example heat and/or surface treatments of the final parts. Thus, all of the plurality of components will undergo the same processing steps.

Having completed manufacture, the next step is to determine a characteristic mechanical property of the first test piece 310, for example using an empirical (i.e. experimental) method.

In examples where a second test piece 320 is provided, the method may additionally or alternatively comprise the step of determining a characteristic mechanical property of the second test piece 320 using an empirical method.

In examples where a third test piece 330 is provided, the method may additionally or alternatively comprise the step of determining a characteristic mechanical property of the third test piece 330 using an empirical method.

Since the first, second and third test pieces are oriented in different orientations (i.e. at an angle to one another), they may advantageously be used to evaluate the material anisotropy (i.e. the different mechanical properties along different axes).

Hence testing at least two of the first, second or third test pieces will provide additional material property results which may increase the accuracy of the subsequent lifing determination.

Additionally, or alternatively different test pieces could each be tested using different empirical methods to determine different mechanical properties (for example, tensile strength and ductility). This data may be fed back into the set up of the manufacturing process for subsequent batches to redefine (i.e. balance) powder composition used in the additive manufacturing technique. Testing different properties may be employed to check that the material compositional balance is right.

Alternatively, or additionally data obtained from the empirical testing methods may be used for a feedback/trial and error/iterative process to alter the composition of powder material used in the manufacturing process, other manufacturing parameters and/or component geometry.

The characteristic mechanical property may be one of Elasticity modulus, Density, Ultimate tensile strength, Proof strength, Low cycle fatigue strength, High fatigue strength, Creep strength or ductility, Oxidation resistance, or Corrosion resistance.

The mechanical property may also be a measure of the material cleanliness (i.e. size and occurrence of defects).

The empirical method may comprise using conventional techniques to conduct specimen testing configured to determine values and/or indications of at least one of elasticity modulus, density, static strength, vibration (High Cycle Fatigue) strength, Low Cycle Fatigue strength, creep strength, oxidation strength, corrosion strength. The material cleanliness can be estimated through sectioning and microscopic material investigation of the specimens. The material cleanliness can also be estimated using Non-Destructive Inspections Techniques, such as ultrasonic inspections.

Where the production component is a component for a gas turbine engine, such as a stator vane, rotor blade or rotor disc, the empirical method may be any suitable standard test and use any standard test equipment to acquire the required data to determine the characteristic mechanical property.

The method may comprise the step of, prior to determining the characteristic mechanical property of the test piece, the step of removing material (i.e. machining) from the test piece to define a standard specimen of a predetermined geometry and size. For example, as shown in FIG. 5, the test piece may be provided as a cylindrical specimen. That is to say, the test piece may be provided as the outer cylindrical specimen shown in FIG. 5. Material is removed from the specimen to produce threads at either end of the specimen to enable positioning of the specimen in a testing machine. A gauge portion (e.g. as shown in FIG. 5 in region 400) may also be machined in order to test the additively manufactured test piece (specimen) in a machined condition.

Figure 6:
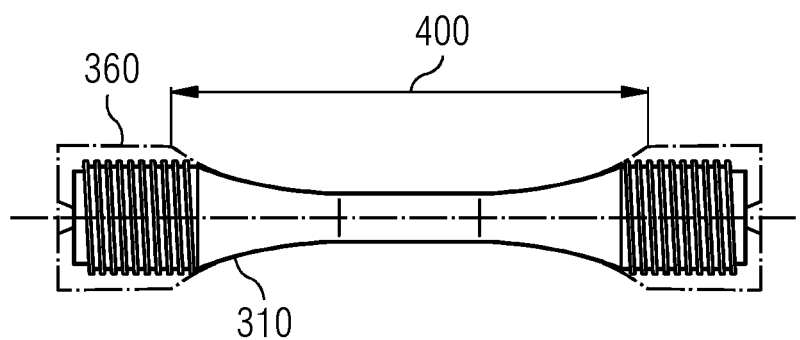

Alternatively, as shown in FIG. 6, the test piece may be provided as a specimen, with the gauge section 400 directly made by additive manufacturing in order to test the additively manufactured specimen in an 'as-is' condition.

The method further comprises the step of determining a value of a life defining quantity of the first production component 100 as a function of the first test piece 310 characteristic mechanical property. This may be achieved by running of finite element models, applying algorithms or look up tables using the characteristic mechanical property as an input as a basis for the determination. Any suitable life determining method may be used.

In examples where a second test piece 320 is provided, the method may additionally or alternatively comprise the step of determining the value of a life defining quantity of the first production component 100 as a function of the second test piece 320 characteristic mechanical property.

In examples where a third test piece 330 is provided, the method may additionally or alternatively comprise the step of determining the value of a life defining quantity of the first production component 100 as a function of the third test piece 330 characteristic mechanical property.

Hence the life defining quantity may be provided as a function of at least one of the characteristic mechanical properties determined for the first test piece 310, second test piece 320 and/or third test piece 330.

The life defining quantity is indicative (i.e. provides an estimate) of the expected operational life and/or number of operational cycles of the first production component 100.

Having established the life defining quantity, the first production component 100 is provided with a first indicator 340 which associates (i.e. assigns) the first production component 100 with the determined life defining quantity, the first test piece mechanical property, and additive manufacturing parameter set. Additionally, the first test piece (310) is provided with a second indicator (341) which associates the first test piece (310) with the determined life defining quantity, the first test piece mechanical property and the additive manufacturing parameter set.

Figure 7:
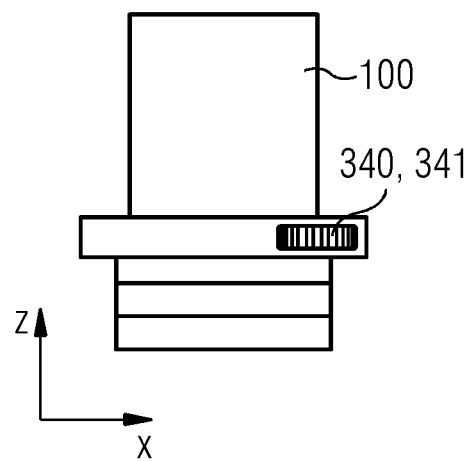
FIGS. 7, 8 show examples of production components with an example indicator.
Figure 8:
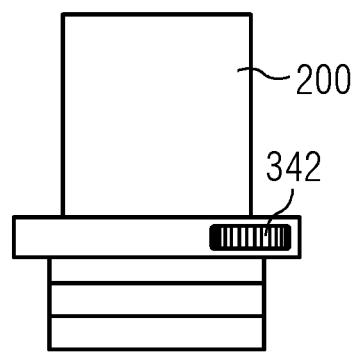

For example, as shown in FIG. 7, the indicator 340, 341 may be provided on the surface of, or internally of, the component. The indicator 340, 341 may be provided as a bar code, QR code or other such coded marking. The indicator may be machined, etched, printed or otherwise recorded into the material of the component. In other examples the indicator may take the form of a separately manufactured label which is adhered or fitted to the component. The indicator will be positioned in a low stressed area of both the specimen (test piece) and the component. That is to say, the indicator will be positioned in a region which, during operation/use, is expected not to experience high stress or act as a stress raising feature.

The additive manufacturing parameter set comprises at least one of a list of parameters related to the plurality of components, the list of parameters comprising:

CAD model geometry reference of the manufacturing batch of the plurality of components;

Part numbers of the plurality of components;

Material powder composition reference used in the manufacture of the plurality of components (for example chemical composition, Particle morphology, Particle size and distribution, Particle porosity, Density, Flowability, Cohesiveness);

Build parameters of a machine operable to execute the additive manufacturing process (for example parameters of a laser used to fuse the powder material used in the additive manufacturing process, which may include Laser power, Laser Spot size, Hatch distance (the spacing between adjacent laser 'passes'), Layer thickness and/or Laser speed); and/or Definition of manufacturing processes after completion of the additive manufacturing process; for example:

Heat treatment may include: Stress relieving/annealing, Hot Isostatic Pressing (HIP), Solution treatment, Ageing, Tempering.

Component machining may include: Milling, Grinding, EDM (Electro-Discharge Machining), Turning.

Surface finishing may include:

Abrasive finishing;

Grit/sand blasting;

Bead/shot blasting;

Abrasive flow; and/or

Electro polishing.

Where provided, the second production component 200 is provided with a third indicator 342, akin to the first indicator 340 and second indicator 341, which associates the second production component 200 with the determined life defining quantity, additive manufacturing parameter set, test pieces and first production component of the same manufacturing batch.

Any or all of the test pieces manufactured as part of the batch may be provided with, or stored with indicators 341 which associates the test pieces with the determined life defining quantity and production components of the same manufacturing batch.

Hence the production components and the test pieces from the same build plate will have an indicator which establishes that they were made in the same manufacturing batch, and hence have the same defining information and life defining quantities.

The information recorded for the test pieces and the components is be defined and associated with a given time point (i.e. the time of manufacturing of a specific batch of components).

As the additive manufacturing process is very flexible and easy to reconfigure, the information obtained from the specimens results and the estimated component life at a given time point may be used to improve the component characteristics for subsequent batches.

Hence, as proposed in step 4 above and indicated in FIG. 2, for a further manufacturing batch of the plurality of components, at least one of:
CAD model geometry of the manufacturing batch of the plurality of components;
Part numbers of the plurality of components;
Material powder composition;
Build parameters of a machine operable to execute the additive manufacturing process; and/or
Definition of manufacturing processes after completion of the additive manufacturing process;
may be determined in dependence of the determined mechanical property of the first test piece and determined value of the life defining quantity.

For example, if the specimens' results or component estimated life are deemed too low against a predefined requirement in a given batch, the following changes could be triggered for the following batches:
CAD model geometry may be modified with for example larger wall thicknesses or larger blending radii in the component definition;
Material powder composition could be altered to achieve a desirable change in mechanical property. For example, the composition may be adjusted, (for example using known metallurgical rules) to increase creep strength vs. oxidation strength;
Build parameters of the machine;
Adjustments to Post Additive Manufacture process parameters—for example altering the surface finish or parameters of heat treatments to effect mechanical properties.

Hence, monitoring of the specimens test results and component estimated life during the manufacturing of successive batches of components may inform later/subsequent decisions to improve and control an iterative process leading to better components.

Thus, there is provided a reliable method of determining, recording and associating a life defining quantity of a component manufactured by an additive manufacturing process, since test specimens and the production components are manufactured as part of the same manufacturing batch and, by use of the indicators, are identified as being part of the same batch with the same properties.

Thus, it is possible that the lives for a build plate with components and specimens made at one time will be different to the lives for a build plate with components and specimens made at later time, where production methods and material composition or component geometry may have changed. With the indicators the production batch, and hence the material properties, are recorded for reference and operational life of the components of each batch may be determined independently and more accurately than by methods of the related art.

The indicator also may be used to identify the manufacturer and defining information of the production parts at a given time point, thereby informing a user of the provenance of the parts. That is to say, the indicator provides a security measure and may inhibit reproduction of parts by third parties. For example, a first batch (batch #1) will have a first data set associated with it (e.g. Defining parameters #1, specimens result #1, component life #1), and a second batch (batch #2) will have a second data set associated with it (Defining parameters #2, specimens result #2, component life #2). Hence forging a component will be difficult as each component is identifiable by a full associated data set. It is unlikely that a non-approved supplier could provide all defining information of the components, even if he were able to reproduce or imitate the geometry of the AM component.

After a batch has been produced and provided with an indicator, any improvement in the manufacturing route can be directly picked up by the specimen testing process, and then the declared life of the components can change accordingly.

This type of ongoing reconfiguration is not possible in standard manufacturing routes such as casting and forging.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of determining a life defining quantity of a production component manufactured by an additive manufacturing process, the method comprising:
defining a plurality of components to be manufactured by an additive manufacturing process defined by a parameter set;
wherein the plurality of components comprises a first test piece and a first production component;
manufacturing the components in the same manufacturing batch using an additive manufacturing process and with nominally the same material composition,
determining a characteristic mechanical property of the first test piece; and
determining a value of a life defining quantity of the first production component as a function of the first test piece characteristic mechanical property,
providing the first production component with a first indicator and providing the first test piece with a second indicator, wherein the first indicator and the second indicator associate the first production component and first test piece respectively with the determined life defining quantity, the first test piece mechanical property and the additive manufacturing parameter set, wherein for a further manufacturing batch of the plurality of components, at least one of: CAD model geometry of the manufacturing batch of the plurality of components; part numbers of the plurality of components; material powder composition; build parameters of a machine operable to execute the additive manufacturing process; and/or definition of manufacturing processes after completion of the additive manufacturing process; are determined in dependence of the determined mechanical property of the first test piece and determined value of the life defining quantity, producing the further manufacturing batch of the plurality of components with the determined at least one of: CAD model geometry of the manufacturing batch of the plurality of components; part numbers of the plurality of components; material powder composition; build parameters of a machine operable to execute the additive manufacturing process; and/or definition of manufacturing processes after completion of the additive manufacturing process.

2. The method as claimed in claim 1, wherein the characteristic mechanical property is one of:

elasticity modulus; density; ultimate tensile strength; proof strength; low cycle fatigue strength; high fatigue strength; creep strength and/or ductility; oxidation resistance; or corrosion resistance.

3. The method as claimed in claim 1, wherein the life defining quantity is indicative of an expected operational life and/or number of operational cycles of the first production component.

4. The method as claimed in claim 1, wherein the additive manufacturing parameter set comprises at least one of a list of parameters related to the plurality of components, the list of parameters comprising: CAD model geometry reference of the manufacturing batch of the plurality of components; part numbers of the plurality of components; material powder composition used in the manufacture of the plurality of components; build parameters of a machine operable to execute the additive manufacturing process; and/or definition of manufacturing processes after completion of the additive manufacturing process.

5. The method as claimed in claim 1, wherein the manufacturing batch is formed on a common build plate.

6. The method as claimed in claim 1, wherein the plurality of components are manufactured in a three dimensional space defined by orthogonal axes x, y and z, wherein the first test piece has a first longitudinal axis and the first test piece is formed such that its longitudinal axis is parallel to one of the x, y or z axes.

7. The method as claimed in claim 6, wherein the plurality of components comprises a second test piece; and wherein the second test piece has a second longitudinal axis and the second test piece is formed such that its second longitudinal axis is parallel to a different one of the axes x, y or z than the first longitudinal axis of the first test piece, and wherein the method further comprises:

determining a characteristic mechanical property of the second test piece; and determining the value of a life defining quantity of the first production component as a function of the second test piece characteristic mechanical property.

8. The method as claimed in claim 7, wherein the plurality of components comprises a third test piece; and wherein the third test piece has a third longitudinal axis and the third test piece is formed such that its third longitudinal axis is parallel to a different one of the axes than the first longitudinal axis of the first test piece or second longitudinal axis of the second test piece, and wherein the method further comprises:

determining a characteristic mechanical property of the third test piece; and determining the value of a life defining quantity of the first production component as a function of the third test piece characteristic mechanical property.

9. The method as claimed in claim 1, wherein the plurality of components comprises a second production component;

wherein the first production component is formed in a first orientation relative to the x, y or z axes;

wherein the second production component is formed the same orientation relative to the x, y or z axes as the first production component;

wherein the second production component is provided with a third indicator which associates the second production component with the determined life defining quantity and additive manufacturing parameter set.

10. The method as claimed in claim 1, further comprising:

prior to determining the characteristic mechanical property of the first test piece, machining the first test piece to define a specimen of a predetermined geometry and size.

11. A method of manufacturing a plurality of components; the method comprising:

manufacturing the plurality of components in the same manufacturing batch using an additive manufacturing process and with nominally the same material composition, wherein the plurality of components comprises a first test piece and a first production component;

wherein the manufacturing batch is formed on a common build plate, manufacturing the plurality of components in a three dimensional space defined by orthogonal axes x, y and z, wherein the first test piece has a first longitudinal axis and the first test piece is formed such that its longitudinal axis is parallel to one of the x, y or z axes; and wherein the first production component is formed in a first orientation relative to the x, y or z axes wherein the plurality of components comprises a second test piece; and wherein the second test piece has a second longitudinal axis and the second test piece is formed such that its second longitudinal axis is parallel to a different one of the axes x, y or z than the first longitudinal axis of the first test piece, and wherein the method further comprises:

determining a characteristic mechanical property of the second test piece; and determining the value of a life defining quantity of the first production component as a function of the second test piece characteristic mechanical property.

* * * * *